W. E. SMITH.
SEAMLESS TUBULAR FABRIC AND PROCESS OF MAKING SAME.
APPLICATION FILED JULY 6, 1916.
1,231,443.
Patented June 26, 1917.
3 SHEETS—SHEET 1.
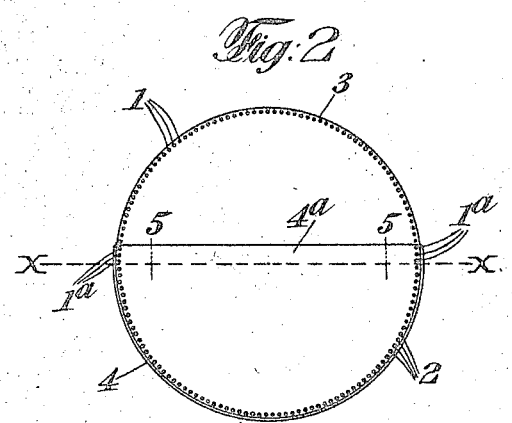
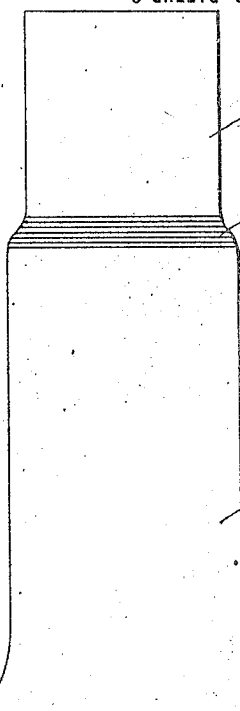
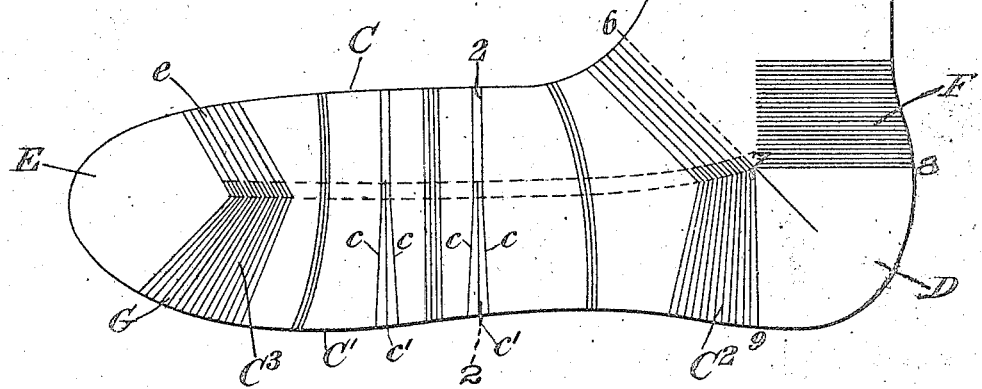
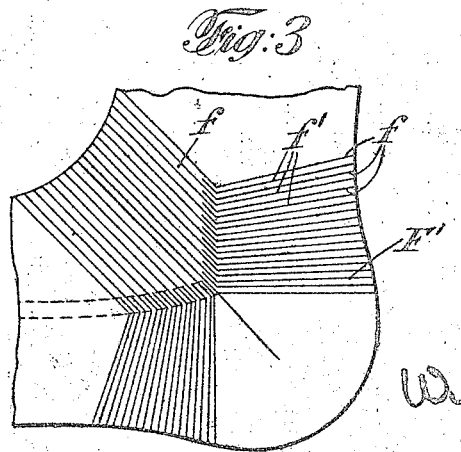
INVENTOR
William E. Smith
BY
William Prescott ATTORNEYS

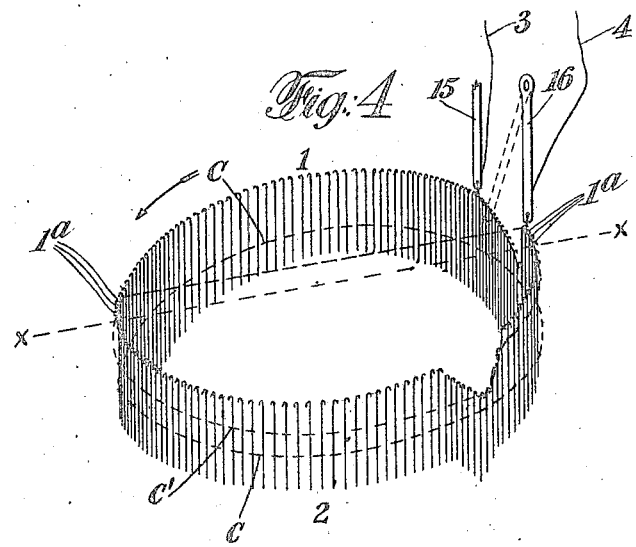
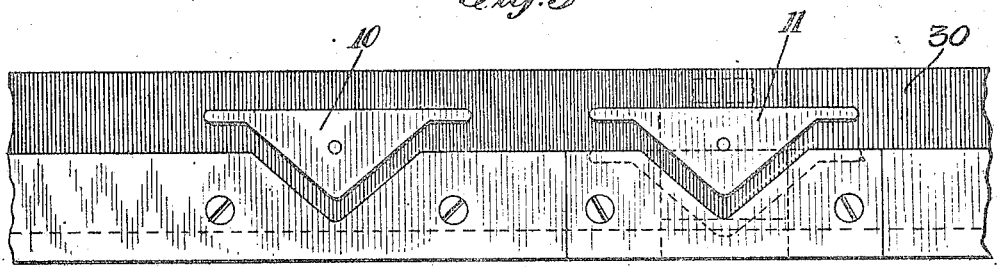
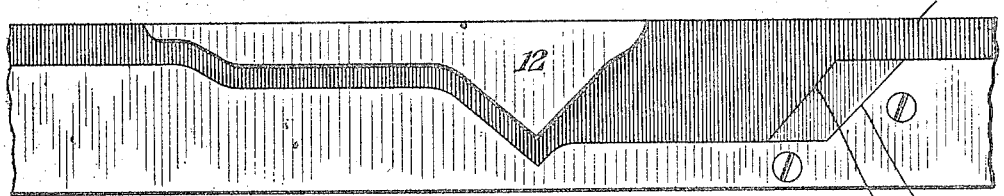
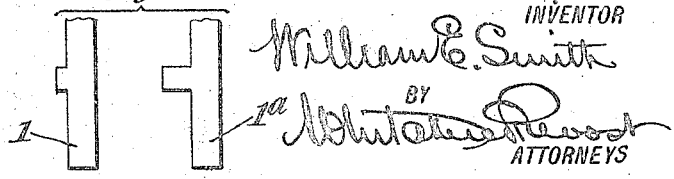

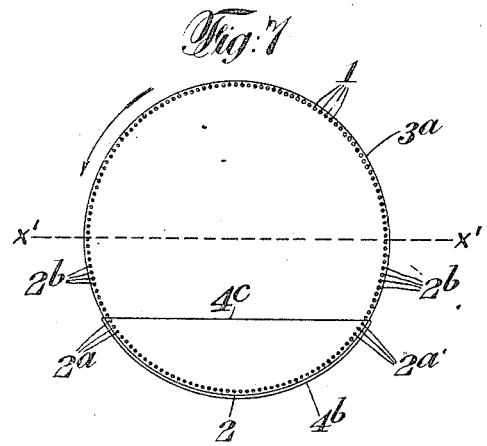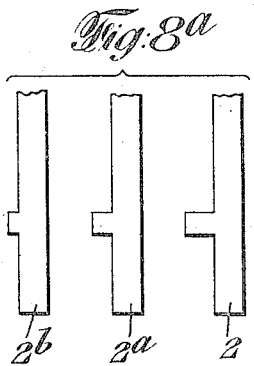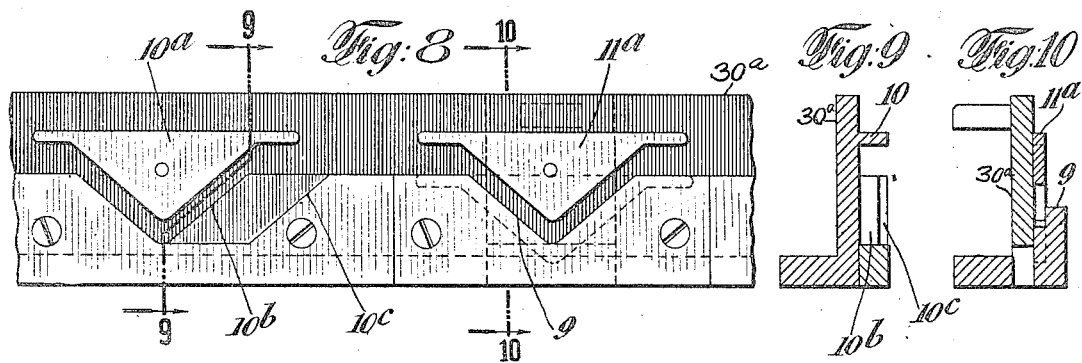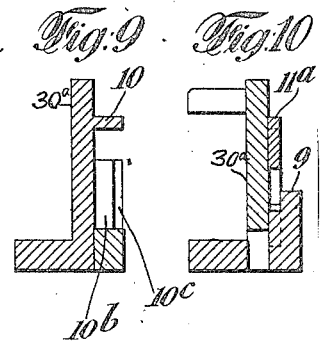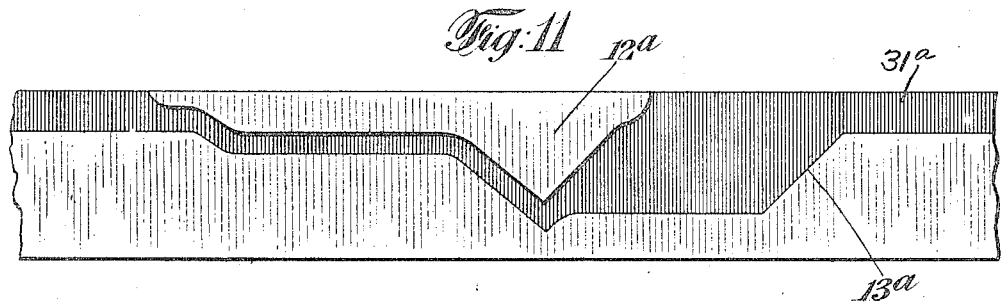

UNITED STATES PATENT OFFICE.

WILLIAM E. SMITH, OF MILLTOWN, NEW JERSEY, ASSIGNOR TO KILBOURN MANUFACTURING CORPORATION, OF NEW BRUNSWICK, NEW JERSEY, A CORPORATION OF NEW JERSEY.

SEAMLESS TUBULAR FABRIC AND PROCESS OF MAKING SAME.

1,231,443.   Specification of Letters Patent.   Patented June 26, 1917.

Application filed July 6, 1916.   Serial No. 107,736.

*To all whom it may concern:*

Be it known that I, WILLIAM E. SMITH, a citizen of the United States, residing at Milltown, in the county of Middlesex and State of New Jersey, have invented certain new and useful Improvements in Seamless Tubular Fabric and Processes of Making Same; and I do hereby declare the following to be a full, clear, and exact description of the invention, such as will enable others skilled in the art to which it appertains to make and use the same.

My invention consists in the novel features hereinafter described, reference being had to the accompanying drawings which show forms in which I contemplate embodying the invention, and one method of carrying the invention into effect and the said invention is fully disclosed in the following description and claims.

Referring to the said drawings:

Figure 1 is a diagrammatic view representing a seamless circular knit stocking knit in accordance with my improved process and embodying my invention.

Fig. 2 is a diagrammatic view representing a section on the line 2—2 of Fig. 1, and showing the circular series of needles which knit the same.

Fig. 3 is a partial diagrammatic view of a seamless circular knit stocking similar to that shown in Fig. 1, but illustrating the invention applied to the high spliced portion above the heel as well as to the sole portion of the stocking.

Fig. 4 is a diagrammatic view indicating a circular series of needles and illustrating the manner of carrying my improved process into effect.

Figs. 5 and 6 are diagrammatic representations of forms of cams for use in connection with suitable needles which may be employed for example in the well known Kilbourn knitting machine for carrying my invention into effect.

Fig. 6ª is a detail view showing needle shanks or jacks having cam engaging nibs of different lengths for engaging the cam shown in Fig. 6.

Fig. 7 is a view similar to Fig. 1 showing a modification of the invention.

Fig. 8 is a view similar to Fig. 5 showing a modified form of cam.

Fig. 8ª represents several forms of needle shanks or jacks provided with nibs of three different lengths for engaging the cam shown in Fig. 8.

Figs. 9 and 10 are vertical sections on the lines 9—9 and 10—10 respectively on Fig. 8.

Fig. 11 is a view similar to Fig. 6 showing a slight modification in the form of a cam.

The object of my invention is to produce a tubular circular knit seamless fabric in which one segmental portion of the fabric is made of greater length than another segmental portion formed integrally therewith and corresponding thereto, by the insertion of additional partial courses between the regular courses of the fabric during circular knitting, and the invention consists in the new process of knitting hereafter described and the new fabric produced thereby, the specific form of the invention being a seamless circular knit stocking embodying the invention and the specific process of knitting the same.

Referring, for example, to Fig. 2 of the accompanying drawing, which illustrates diagrammatically a cross section of the seamless tubular fabric, 1—2, represent a circular series of needles, of any desired number, upon which the circular seamless fabric is knit, preferably in a circular knitting machine, by circular knitting. In this figure the dotted line indicates the line of demarcation between the segmental group of needles, 2, which in this figure are shown as those upon which the lengthened segmental portion of the fabric is knit and the needles, 1, upon which is knit the ordinary circular knitting. These needles, 1—2, are operated, it will be understood, by suitable knitting cam or cams and supplied with thread by suitable thread guide or guides as hereinafter described.

In carrying out my invention, I supply, during each circular course of knitting, a main thread indicated by the lines, 3, to all of the needles, 1—2, for the knitting of a complete circular course of stitches in the usual and well known manner and in conjunction therewith I supply, during the knitting of a circular course, or during the knitting of each of a plurality of successive circular courses, as preferred, an extra thread indicated at 4 to the needles, 2, the additional thread being supplied to the needles, 2, either before or after the main knitting thread, 3, has been supplied to them and they have formed their respective stitches of the circular course, and the needles, 2, being provided with an additional cam or cams for separately operating them in conjunction with the additional thread, 4, to form an additional partial course which precedes or follows the corresponding stitches of the main course knit with the thread, 3. It will thus be understood that in a single circular course of knitting each of the needles, 1, will be operated by a knitting cam in connection with the thread 3, to knit a single stitch while each of the needles, 2, will be operated twice to knit a partial course with the thread, 3, and an extra partial course with the thread, 4, which is preferably floated across the needle cylinder from one side of the fabric to the other. These floats will be cut out after the completion of the knitting as indicated at 5—5 or the thread, 4, may be cut after each partial course and re-introduced on the other side of the tube, if desired, although I prefer to float the thread, 4, across the tube as indicated at 4ª. To prevent the cut ends of the thread, 4, from pulling out to the exterior surface of the fabric and to tie them into the tubular fabric so as to firmly unite the lengthened fabric in one segment of the tube with the unlengthened fabric of the other segment, I prefer to introduce the thread, 4, at a point within the segment formed by the needles, 1, and to throw it out after it has been fed to one or more needles of the segment of needles and on the other side of the tube, as indicated in Fig. 2, in which I have shown the thread, 4, as being fed to two needles, 1ª, at each side of the tube, of the group of needles, 1. It may, however, be fed to one, two, or more needles, 1ª, of the needles 1, at each side of the tube as may be found desirable.

The needles, 1ª, preferably do not coöperate with the additional cam for knitting stitches with the thread, 4, upon the needles, 2, and, therefore, the portions of the thread, 4, which are fed to the needles, 1ª, simply remain within operative relation to the hooks of the needles until the next course of circular knitting is knit at which time such portions of the thread, 4, together with the thread, 3, for the said next course are simultaneously knit, thereby tying in the ends of the thread, 4, into the normal stitches formed by the needles, 1ª, and thread, 3, and locking them in the fabric so that they will not pull out. It will be understood that the gage of the stitches formed by the needles, 1, and the needles, 2, is substantially identical.

I prefer that the gage of stitches made by the needles, 1ª, shall be the same as those made by the needles, 1, and also by the needles, 2, as thereby the additional thickness produced by the terminal portions of the thread, 4, being fed to the needles, 1ª, will make the stitches knit thereby tighter and more securely hold the said terminal portions of the thread, 4, in the fabric.

It is within the scope of my invention, however, to vary the gage of the stitches slightly and especially the gage of the stitches formed by the needles, 1ª, for the purpose of more readily accommodating the extra thread, 4, in the stitches formed thereby which are the only stitches in the course containing the two threads. In Fig. 1, I have shown my invention applied to the knitting of a circular knit seamless stocking in which a plurality of courses, which may or may not be consecutive, as preferred, knit as heretofore described, are formed in the foot portion of the stocking, the additional inserted courses formed by the thread, 4, being located in the sole portion thereof for the purpose of making the sole of the stocking longer than the corresponding portion of the top of the foot to fashion the stocking, in the process of knitting it, to fit the foot. It is a known fact that to make the stocking fit the foot it is necessary that the sole portion shall be from a half size to a size longer than the corresponding fabric of the top of the foot as disclosed, for example, in Letters Patent of the United States granted to Edward E. Kilbourn, Isaac W. Kilbourn and Wm. E. Smith #1,110,443, dated September 15th, 1914, in which the desired lengthening of the sole portion of the stocking is secured by lengthening or increasing the gage of the stitches in the sole portion of the foot.

In Fig. 1 of the drawing, I have illustrated a seamless circular knit stocking embodying my invention and knit in accordance with my process. In this figure, A represents the usual rib top which is used in the case of men's half hose, B represents the leg portion of the stocking, D the heel pocket, E the toe pocket, joined to the top portion of the foot by the usual toe joining indicated at e, and F indicates the portion at the back of the leg above the heel which is usually reinforced and which is termed the high-spliced portion or the high-splice.

In knitting the stocking illustrated in Fig. 1, the rib top, a, is formed in the usual manner and run on to the needles of the knitting machine which are then operated to knit the leg, B, by circular knitting with the main knitting thread indicated at 3 in Fig. 2. I prefer to reinforce the courses immediately adjacent to the rib top, as indicated at b, to form a top band either by introducing an additional reinforcing thread or by knitting this portion of the stocking with a separate thread, as preferred, but this forms no part of my present invention.

The leg of the stocking is knit preferably by plain circular knitting with thread 3 down to the beginning of the heel, as indicated by the lines, 6, 7 and 8, and, if desired, the high-spliced portion, F, can be reinforced in any usual or desired manner. The heel pocket, D, is then knit by reciprocating work, as usual, or in any other desired manner, after which the knitting of the foot portion is commenced at 6, 7 and 8, it being understood that during the knitting of the heel the section of the needles, 1—1ª, which knit the main part of the leg and top part of the foot remain stationary. In knitting the foot of the stocking circular knitting is resumed, the main knitting thread, 3, being fed to all the needles as in knitting the leg. In order to give the increased length to the sole portion, C¹, so as to make it longer than the fabric, C, of the top of the foot, corresponding therewith, I introduce the extra partial courses, indicated at c¹—c¹, in the sole portion, C¹, between adjacent courses, c, by causing the needles, 2, which knit the sole of the stocking to perform two knitting operations in a single circular course, as heretofore described, and introducing the extra thread, 4, in the manner heretofore set forth.

I may introduce these extra partial courses at intervals, or I may introduce a number of them successively sufficient to add the desired length to the sole, at one point only, or I may introduce a succession of these partial courses at two or more points in the sole as preferred. For example, I may knit a plurality of successive circular courses adjacent to the heel, as indicated in Fig. 1, in each of which the needles knitting the sole make two stitches in each round while the needles knitting the top of the foot make only one stitch, thus forming a lengthened fabric portion, indicated at C², or I may form a plurality of such courses adjacent to the outer end of the foot portion to form a lengthened fabric portion, indicated at C³, or I may form these courses at both ends of the foot portion, if desired, or I may form these courses in a group between the ends of the foot portion, or I may distribute these courses by introducing them singly or in groups of any desired number at intervals throughout the length of the foot. In any case the foot portion of the stocking will contain a definite number of circular courses which extend entirely around the foot while the sole portion will contain in addition thereto a number of partial courses extending through the sole and increasing the length of the sole beyond that of the top of the foot in accordance with the number of the inserted partial courses, while the entire foot portion may be knit by circular knitting without stopping the machine.

It will also be understood that I prefer, as hereinbefore described, to carry the thread forming the extra or inserted partial courses to a plurality of needles at each side of the stocking which knit the top portion, C, of the fabric as previously described in connection with Fig. 2 so that such portions of the extra thread will be drawn into the stitches of the top portion, C, when the next circular course is knit with the main knitting thread, 3, while the thread, 4, is floated across the foot or severed and reintroduced as may be found most desirable, thus tying in the ends of the separate threads forming the extra partial courses in the finished fabric, the floats being cut out.

In Fig. 3, I have shown a modification of the stocking illustrated in Fig. 2 in which a plurality of the circular courses are knit with the intervening partial courses, in the manner heretofore described, for the purpose of lengthening the high-spliced portion at the top of the heel and still further fashioning the stocking to fit the foot, the high-spliced portion being indicated at F¹ and the inserted partial courses being indicated at f¹ while the main circular courses knit with the main knitting thread are indicated at f. It is to be understood in connection with Fig. 3 that the other portions of the stocking may be knit, as heretofore described, with reference to Fig. 1.

In Fig. 1, I have shown a plurality of circular courses adjacent to the toe pocket, as indicated at G, extending throughout the top of the foot and also the sole of the foot and forming what is termed the toe band, as shown for example in the United States Letters Patent granted to John Wyckoff Mettler #862,575, dated August 6th 1907, to the lower part of which the toe pocket is knit and to the upper part of which the toe is joined by the toe joining, e, but this toe band forms no part of my present invention and both the toe band, G, and the top band, b, may be omitted, if desired.

My invention may be carried out in many ways by hand and also by mechanical means. I have found it convenient to carry the invention into effect by means of the well known Kilbourn knitting machine in which two cam cylinders are employed, one of which carries a knitting cam which operates the needles forming the front of the leg and top of the foot while the other cam cylinder is provided with a knitting cam for operating the needles which form the rear of the leg, the sole of the foot and the heel and toe pockets. In this machine both cam cylinders are rotated simultaneously during circular work and the second cam cylinder is reciprocated alone during reciprocating work. In carrying out my present invention by means of the Kilbourn knitting machine, I provide a cam ring, 30, which actuates the needles, 2, for knitting the rear part of the leg, the sole and the heel and toe pockets, with two knitting cams arranged to actuate the needles successively and I provide the machine with a main thread guide which delivers the main knitting thread, 3, to all of the needles during circular work, and an auxiliary thread guide thrown into and out of operation in a well known way at opposite sides of the needle cylinder for delivering the extra thread, 4, to the needles, 2, and the needles, 1ª, which extra thread guide is arranged to operate in coöperation with the second or extra knitting cam.

Fig. 5 of the drawing represents the interior of the cam cylinder, 30, for operating the needles, 2, which knit the back part of the leg and sole of the stocking, as it would appear if the cam cylinder was cut in two and spread out, and it will be seen that it is provided with two knitting cams indicated at 10 and 11 respectively, the cam 10 being the usual knitting cam and the cam 11 being the extra knitting cam following the main knitting cam for knitting an extra partial course during each revolution of the cam cylinder, in which it is used. The cam, 11, is preferably movable vertically into and out of operation, as indicated in the drawing, so that it may be depressed either by hand or by well known mechanism under the control of the pattern mechanism of the Kilbourn machine so that the cam, 11, will not be in operation during ordinary circular work or during reciprocating work.

Fig. 6 is a similar view of the cam cylinder, 31, for operating the needles, 1, which knit the main part of the leg and top of the foot of the stocking. This cylinder is provided with the usual knitting cam, indicated at 12, the riser cam being indicated at 13. In order to have a plurality of the needles, 1, at each side of the tube returned to elevated position before the others so as to receive the thread, 4, from the additional thread guide, I prefer to provide such needles, to wit, the needles, 1ª, with long nibs and the remaining needles, 1, with short nibs, and to provide a supplemental riser cam indicated at 14 of less depth having its inner face cut away so that it will engage only the long nib needles, 1ª, and raise them sufficiently in advance of the other needles so that they will be in proper position to take the thread, 4, from the extra thread guide.

In Fig. 4, I have illustrated diagrammatically in perspective the arrangement of the needles, 1, 1ª, and 2, the main thread guide carrying the thread, 3, being indicated at 15, while the auxiliary thread guide indicated at 16 carries the thread, 4, and may be swung to the inside of the circle of the needles after passing the needles, 1ª, at one side of the tube and swung outwardly in advance of the needles, 1ª, at the other side of the tube, the thread, 4, floating across the tube as indicated at 4ª. The thread guide, 16, may be operated by hand or by means of mechanism under the control of the pattern mechanism, thus in Fig. 4, I have not shown any specific mechanism for throwing the thread guide, 16, into and out of operation, as such mechanism is known in the art and one form of the same is shown, for example, in the United States Letters Patent #669,730, to Edward E. Kilbourn, granted March 12th, 1901.

Referring now to Fig. 4, it will be seen that as the thread guides pass around the needle cylinder in conjunction with the cam cylinders for operating the needles, 1—1ª, and 2, the thread 3, will be fed to the needles, 1, while the thread guide, 16, will be in the position indicated in dotted lines in Fig. 4 and the thread 4, will be floated across the tube until the left hand set of needles, 1ª, is reached when the thread guide, 16, will be thrown outward into operative position. The needles, 1ª, will take the thread, 3, from the thread guide, 15, and immediately rise to receive the thread, 4, from the thread guide, 16. Meanwhile the thread guide, 15, will feed the thread, 3, to the needles, 2, which are operated first by the knitting cam, 10, to make the stitches of the complete circular course, and as soon as the needles are raised they will receive the thread, 4, from the guide, 16, and be acted upon by the auxiliary cam, 11, to form a separate partial course of stitches. The thread guide, 15, passes on to the needles, 1, delivering the thread, 3, for the next course, the said needles being acted upon by the cam, 12, to knit, and permitting the thread guide, 16, to deliver the thread, 4, to all of the needles, 2, in connection with the auxiliary cam, 11, to complete the partial course, while the needles, 1, are knitting the next consecutive course. The needles, 1ª, will be thrown up by the auxiliary riser cam, 14, sooner than the adjacent needles, 1, as shown in Fig. 4, to enable the needles, 1ª, to receive the extra thread, 4, which they hold until the next successive course is knit and then knit in the end portions of the thread, 4, with the thread, 3, in such successive course as heretofore explained. The mechanism herein shown and described for carrying my invention into effect forms no part of my present invention as the same is covered by a separate application for Letters Patent of the United States, filed July 6, 1916, and given Serial #107,737.

In some instances, it may be desirable to insert the partial courses hereinbefore described through a narrower segment of the fabric than is shown in Fig. 1, for example, as in knitting a high spliced portion, which is narrower than the heel, or in knitting a sole portion in which the bottom portion is increased in length without carrying the partial courses up around the sides of the foot to the ordinary lateral suture. In such case the needles knitting the partial courses would constitute only a section of the needles which knit the front half or rear half of the tube, the line of demarcation between which is indicated by the dotted line $x^1$—$x^1$ in Fig. 7. In this figure, for example, the needles, 1, represent those which knit the front of the leg of the stocking and the top of the foot, and the needles, 2, $2^a$ and $2^b$ constitute the portions of the circular series which normally knit the back of the leg, the heel and toe pockets, and the sole portion of the foot. In this instance, the partial courses will be limited to the needles, 2, constituting a portion of this series of needles, and the additional thread indicated at $4^b$, will be fed as hereinbefore described not only to the needles, 2, but also to a plurality of tying-in needles, $2^a$, located at opposite sides of the group of needles, 2, the needles, $2^b$, constituting the balance of the needles of this half or series, as clearly indicated in Fig. 7.

Under these conditions, I prefer to modify the cam which operates the needles, 2, $2^a$ and $2^b$ for circular knitting so as to cause the formation of the partial courses as hereinbefore described, and preferably also to raise the needles, $2^a$, in advance of the needles, $2^b$, to receive the extra thread, $4^b$, and hold it until the next course of circular knitting with the main knitting thread, $3^a$, so that the ends of the thread, $4^b$, will be tied in to the next circular course of stitches. This result may be accomplished in many ways, but I have shown, in this instance, an arrangement of cams suitable for use in the well known Kilbourn knitting machine, which I will now describe. In carrying out this modification of the invention, I prefer to provide the needles, 2, with a longer cam engaging nib than those of the needles, $2^a$ and $2^b$, the needles, $2^b$, being provided with a short nib, and the needles, $2^a$, with what I term intermediate length nibs, which are longer than those of the needles, $2^b$, but shorter than those of the needles, 2.

The cam ring, shown in Fig. 8, which is the upper cam cylinder of the Kilbourn knitting machine, is provided with a main knitting cam, $10^a$, having the usual riser cam grade, $10^b$, of such reduced thickness that it will engage only the needles, 2, and $2^a$, and raise them immediately, and I provide a separate riser cam grade, $10^c$, for raising the needles, $2^b$, provided with the short nibs at a later period in the revolution of the cam cylinder. For knitting the intermediate partial course, I employ an auxiliary cam, $11^a$, similar in all respects to the cam, 11, shown in Fig. 5, except that it is reduced in thickness so that it engages only the long nibs of the needles, 2, which may be of any desired number and constitute a wider or narrower segment of the tube, as preferred.

The cam which operates the needles, 1. is illustrated in Fig. 11 at $12^a$ on the cam cylinder, $31^a$ and is provided with the usual riser grade, $13^a$, which operates on all of the needles, 1. In knitting this fabric and inserting these short extra courses, it will be understood that the main knitting thread, $3^a$, will be fed to the needles, 1, $2^b$, $2^a$, 2, $2^a$ and $2^b$ passing around the needle cylinder in the direction of the arrow, for example in Fig. 7, to make an ordinary course of knitting. During the knitting of this course, and after the main thread guide has commenced to deliver the main knitting thread to the needles, 2, the auxiliary thread guide, such for example as that indicated at 16 in Fig. 4, will introduce the extra thread, $4^b$, delivering it first to the first group of tying-in needles, $2^a$, which are elevated by the riser cam grade, $10^b$, before the needles, $2^b$, adjacent thereto are raised.

The additional thread, $4^b$, is then fed to the tying-in needles, $2^a$, the needles, 2, and the second group of tying-in needles, $2^a$, which are likewise raised immediately after drawing their stitch with the thread, $3^a$, and before the adjacent needles, $2^b$, when the auxiliary thread guide will be moved out of operative position and the extra thread will be floated across the cylinder, as indicated at $4^c$. These floats will be cut away after the fabric is completed, and it will be seen that the end portions of the thread, $4^b$, fed to the tying-in needles, $2^a$, will be knit, together with the main knitting thread, $3^a$, into the stitches of the next circular course.

While I have shown he extra cams, 11 and $11^a$, herein, as movable vertically into and out of operative position, it is within the scope of my invention to move these cams into and out of operative position in any desired way, as for example, by having the said cams movable in a radial direction through the recess in the wall of the cam cylinder or otherwise into and out of operative relation with the nibs of the needles actuated thereby.

It is also unnecessary in some cases to actuate the auxiliary thread guide for the purpose of throwing it into and out of operation with the needles, as in practice it will be found that by locating the auxiliary thread guide in rear of the thread guide which delivers the main knitting thread, the auxiliary thread guide will pass the needles knitting the front of the leg and top of the foot while they are drawn down with the exception of the tying-in needles which receive the thread in the manner previously described and that, therefore, the auxiliary thread will be floated across the tube even if the auxiliary thread guide remains at all times in operative position. The operation herein before described will, therefore, take place whether or not the auxiliary thread guide is alternately moved into and out of operative position.

What I claim and desire to secure by Letters Patent is:

1. The herein described process of knitting a tubular fabric, which consists in feeding a continuous main knitting thread circularly and knitting therewith a plurality of single contiguous courses, introducing an extra thread not continuous with the thread forming any circular course, and knitting therewith a partial course of stitches during the formation of a circular course with the main thread, upon a plurality of consecutive stitches thereof less than the whole number of stitches in said circular course, and simultaneously with the formation of other stitches of said circular course with the main knitting thread, and then knitting a circular course of stitches with the main knitting thread upon the stitches of said partial course, and the stitches of the preceding circular course between the ends of the said partial course.

2. The herein described process of knitting a seamless tubular fabric which consists in forming a plurality of contiguous circular courses of plain knit stitches with a single continuous main knitting thread, and knitting a partial course of plain knit stitches with an extra thread between portions of two contiguous circular courses, and knitting end portions of the extra thread at each end of said partial course together with the main knitting thread into stitches of a contiguous circular course.

3. The herein described process of knitting a seamless tubular fabric which consists in feeding a main knitting thread circularly and forming therewith a plurality of circular contiguous courses of plain knit stitches, feeding an extra thread, and forming a partial course of stitches upon a group of successive stitches of a circular course less than the whole number simultaneously with the formation of an equal number of stitches of the said circular course and floating the extra thread across the circular course from one end to the other of the partial course, during the formation of other stitches of the circular course, again feeding the main thread circularly and forming another circular course of stitches therefrom upon the stitches of the partial course, and the stitches of the preceding circular course between the ends of the partial course, and knitting the end portions of the extra thread at each end of the partial course into certain stitches of said second mentioned circular course adjacent to the ends of the said partial course.

4. The herein described process of knitting a seamless tubular fabric on an endless series of instruments which comprises feeding a main knitting thread in an endless course to all of the series of instruments and forming a plain knit stitch therefrom with each of said instruments, and feeding an extra thread to a group of said successive instruments less than the entire number in said series, and again actuating the instruments of said group during the formation of the said endless course to form an extra partial course of stitches and feeding said extra thread to instrumentalities of the endless series at each end of said group without forming stitches thereon, and then feeding the main thread to all of the instrumentalities of the series and forming a stitch therefrom with each of said instruments, whereby the ends of the extra thread forming such partial course will be knit into stitches of the adjacent circular course with the main knitting thread thereof.

5. The herein described process of knitting a seamless tubular stocking, which consists in knitting the leg portion by circular knitting with a main knitting thread, forming the heel pocket, knitting the foot portion by circular knitting with a main knitting thread to form circular courses of stitches, and forming a plurality of partial courses from an extra thread to make the sole portion of the foot substantially a size longer than the corresponding top portion to fashion the stocking to the foot, and forming the toe pocket.

6. The herein described process of knitting a seamless tubular stocking, which consists in knitting the leg portion by circular knitting with a main knitting thread forming the heel pocket, knitting the foot portion by circular knitting with a main knitting thread to form circular courses of stitches, and forming, during the knitting of each of a plurality of said circular courses of stitches, a partial course of stitches from an extra thread extending through the sole portion only of the foot to make the sole portion of the foot substantially a size longer than the corresponding top portion to fashion the stocking to the foot.

7. The herein described process of knitting a seamless tubular stocking, which consists in knitting the leg portion by circular knitting with a main knitting thread, forming the heel pocket, knitting the foot portion by circular knitting with a main knitting thread to form circular courses of stitches, and forming a plurality of partial courses from an extra thread in the sole portion only of the foot between adjacent circular courses, and knitting the ends of the extra thread forming each of said partial courses into stitches of an adjacent circular course of stitches.

8. The herein described process of knitting a seamless tubular stocking, which consists in knitting the leg portion by circular knitting with a main knitting thread, forming the heel pocket, knitting the foot portion by circular knitting with a main knitting thread to form circular courses of stitches, and forming, during the knitting of each of a plurality of said circular courses of stitches, a partial course of stitches from an extra thread extending through the sole portion only of the foot to make the sole portion of the foot substantially a size longer than the corresponding top portion to fashion the stocking to the foot, and knitting the ends of each thread forming such partial courses into stitches of the next adjacent circular course of stitches.

9. The herein described process of knitting a seamless tubular stocking, which consists in knitting the leg by circular knitting with a main knitting thread to form circular courses of stitches, and knitting a plurality of partial courses of stitches with a separate thread by circular knitting extending through the rear portion of the leg only above the heel, knitting the heel, knitting the foot of the stocking and knitting the toe pocket.

10. The herein described process of knitting a seamless tubular stocking, which consists in knitting the leg by plain circular knitting with a continuous single main knitting thread to form contiguous circular courses of stitches therefrom, and knitting a plurality of partial courses of plain stitches with a separate thread by circular knitting extending through the rear portion of the leg only above the heel, between portions of adjacent circular courses, knitting the heel, knitting the foot portion of the stocking by plain circular knitting with the main knitting thread, and knitting a plurality of partial courses of stitches from an extra thread extending through the sole portion only and between adjacent circular courses, and knitting the toe pocket whereby the stocking is fashioned above the heel and through the sole, and the sole portion is made longer than the top of the foot.

11. A seamless tubular fabric comprising successive circular courses of stitches formed from the same thread, and extra partial courses of stitches formed of a separate thread interposed between adjacent circular courses and located in a segmental portion of the tube to lengthen the fabric throughout said segmental portion, the ends of a separate thread forming each of said partial courses being knit into the stitches of an adjacent circular course.

12. A fashioned seamless stocking having the foot portion composed of circular courses of stitches formed of a continuous thread, and having in the sole portion only of said foot portion a plurality of extra partial courses of stitches formed of a separate thread, each partial course being located between two adjacent circular courses to make the sole portion of the foot substantially a size longer than the corresponding top portion thereof, and fashion the stocking to the foot.

13. A fashioned seamless stocking having the foot portion composed of circular courses of stitches formed of a continuous thread, and having in the sole portion only of said foot portion a plurality of extra partial courses of stitches formed of a separate thread, each partial course being located between two adjacent circular courses, the ends of the extra thread forming each partial course being knit into stitches of the next adjacent circular course.

14. A fashioned seamless stocking having the leg portion above the heel composed of circular courses of stitches formed of a continuous thread, and a plurality of partial courses of stitches formed of a separate thread located between adjacent circular courses, and extending only through the rear portion of the leg above the heel to lengthen the segment of the fabric above the heel.

15. A fashioned seamless stocking having the leg portion above the heel composed of circular courses of stitches formed of a continuous thread, and a plurality of partial courses of stitches formed of a separate thread located between adjacent circular courses, and extending only through the rear portion of the leg above the heel to lengthen the segment of the fabric above the heel, and having the sole portion formed of circular courses of stitches knit with a continuous thread, and a plurality of partial courses of stitches formed of a separate thread located between adjacent circular courses, and extending through the sole portion only of the stocking to make the sole of the stocking substantially a size longer than the corresponding top portion of the foot, and fashion the stocking to the foot.

In testimony whereof I affix my signature.

WILLIAM E. SMITH.